Dec. 9, 1969

H. H. JENKINS 3,483,348

ELECTRIC ARC TYPE CUTTING GUN

Filed June 26, 1967

INVENTOR.
HENRY H. JENKINS
BY
Woodling, Krost, Granger + Rust
attys.

Dec. 9, 1969    H. H. JENKINS    3,483,348
ELECTRIC ARC TYPE CUTTING GUN
Filed June 26, 1967    2 Sheets-Sheet 2

INVENTOR.
HENRY H. JENKINS
BY
Woodling, Krost, Granger & Rust
Attys.

3,483,348
ELECTRIC ARC TYPE CUTTING GUN
Henry H. Jenkins, 864 W. Hacienda Drive,
Corona, Calif. 91720
Continuation-in-part of application Ser. No. 583,269,
Sept. 30, 1966. This application June 26, 1967, Ser.
No. 648,763
Int. Cl. B23k 9/00, 9/28
U.S. Cl. 219—70                            10 Claims

ABSTRACT OF THE DISCLOSURE

An electric arc cutting gun including a housing defining an insulated handle part for gripping by an operator through which air under pressure is passaged to a head. The air is controlled through a hand operated valve and a heat shield protects the hand of an operator. The head includes an opening extending therethrough and a tubular member mounted therein defines an annular space or chamber with the opening. The ends of the annular space are closed and a tubular chuck is mounted on the tubular member and is adapted to hold an electrode which may be inserted into either end of the chuck. The annular space is connected to the air passage. A plurality of openings are provided to exit the annular space to emit air around the electrode held by the chuck. These openings may be of several shapes and in some embodiments the tubular member may form a portion of the walls of the plurality of openings. Another embodiment has an opening leading from the annular chamber through the tubular member into the chuck to cool the chuck under operating conditions.

---

This application is a continuation in part application of Ser. No. 583,269 filed Sept. 30, 1966, now abandoned.

An object of the present invention relates in general to a gun or apparatus for metal cutting and more particularly to such a device which utilizes an electrode around which compressed air is expelled in such a manner as to remove metal which has been melted as a result of an electric arc between the electrode and the work.

Another object of the present invention is to provide a metal cutting or gouging gun which is economical in construction and which is efficient in operation.

Another object of the present invention is to provide a metal cutting gun which includes an electrode and means for ejecting compressed air along and around the electrode to blow melted metal away in such a way that the molten metal is not thrown as far and as wildly as in prior devices.

Another object of the present invention is to provide a metal cutting gun with compressed air ejection openings designed to efficiently eject air from a compressed air chamber to the end of the electrode using in striking and maintaining the arc.

Another object of the present invention is to provide a metal cutting gun which is of a pistol grip type construction with a heat shield at the grip and a manual air valve in a position to be conveniently manipulated by an operator's finger.

Another object of the present invention is to provide a metal cutting gun which has spring finger type chuck for holding electrodes which chuck is open at both ends to provide for the continuous feeding of electrodes.

Another object of the present invention is to provide a metal cutting gun having an electrode around which a plurality of air ejecting openings are located which lead from a supply chamber and which have a length over diameter ratio of at least six and more preferably at least eight.

Other objects and a fuller understanding of this invention may be had by referring to the following description and claims, taken in conjunction with the accompanying drawings, in which:

Figure 1:
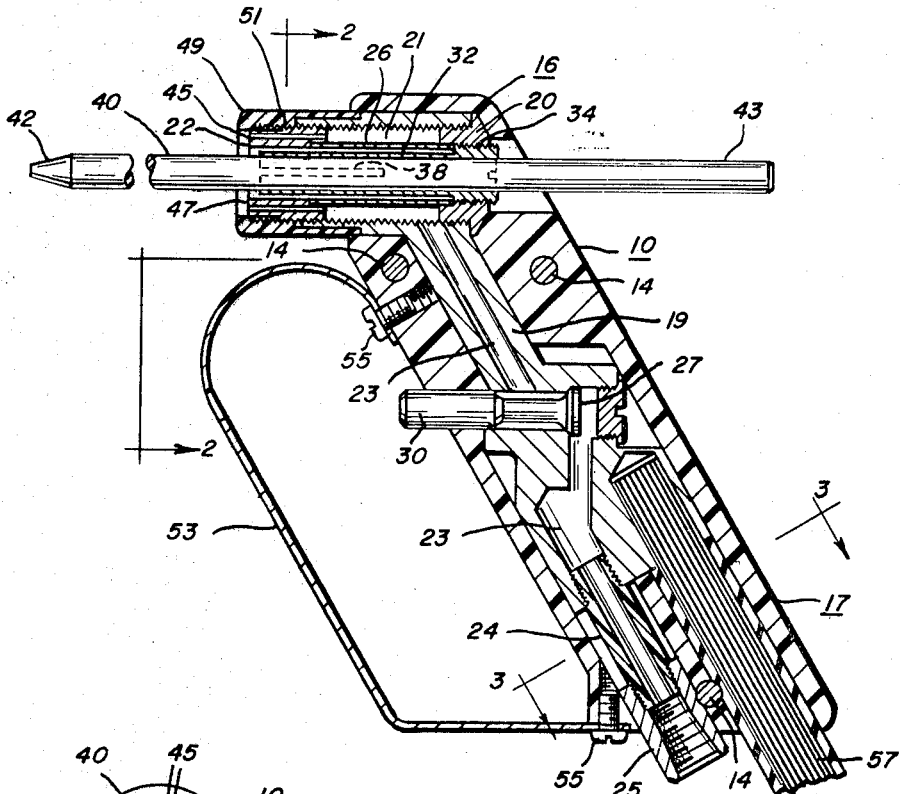
FIGURE 1 is an elevational view in section of the metal cutting gun constructed in accordance with the teachings of the present invention.

The metal cutting gun of the present invention includes in combination a housing 10 preferably of a plastic material or other suitable electrical insulating construction and as will be noted, the housing comprises first and second mating parts 12 and 13 which are held together by three screws 14. The housing 10 also has first and second end portions 16 and 17, respectively. A metal body member 19 is located in the housing and is held in a fixed position therein by means of the screws 14. Wall means are provided in the metal body member which serve to define the outer limits of an annular air chamber 21 which is located at the first end portion 16 of the housing. The air chamber 21 is closed at one end by a threaded plug 20 and at the other end by a threaded air ejection member 22. A piece of tubing 26 is press fitted at one end into the bore of plug 20 and at the other end mates with an internal bore through the air ejection member 22 to define the inner limits of the chamber 21. Wall means 23 are provided in the metal body member and define an air passage which extends from the air chamber 21, through the body member and terminates at the second end portion 17 of the housing. The air passage 23 at the second end portion is comprised of a plastic nipple 24 threadably secured to the body member 19 at one end portion and at its other end it is threadably secured to a pipe threaded coupling 25. The pipe threaded coupling 25 comprises a means for connecting a pressurized source of air (not shown) to the air passage 23 to supply pressurized air to the air chamber 21. An air valve 27 is located in the air passage 23 and is normally biased to a closed position by means of air under pressure traveling from coupling 25 through passage 23 on its way to chamber 21. It of course would be possible to interpose a spring to aid in closing the valve. A plunger 30 or actuating member is connected to the air valve and extends exteriorly of the housing 10 in a position to be moved by an operator of the gun. When an operator moves the plunger 30 the valve moves to an open position and air may travel from a source to the air chamber 21. The plunger 30 may be conveniently provided with a mechanism to keep it in a depressed condition so that an operator of the device need not continuously hold the air valve open during operation of the gun. A convenient source of air pressure for the metal cutting gun of the present invention might be conventional shop air pressure found in most commercial establishments.

A chuck assembly is provided which includes an annular chuck member 32 which extends axially through the air chamber 21. Also included in the assembly is the tubing 26. One end of the annular chuck member is threadably secured to a plug 20 by threads as at 34 and another end portion of the chuck member extends through the tubing 26 in a cantilever fashion. The other end portion of the annular chuck member 32 is provided with a plurality of circumferentially spaced and axially extending slots 38 which slots serve to define spring fingers therebetween which are for the purpose of holding an electrode 40 which is adapted to extend axially therethrough. When the electrode becomes worn away at end 42, it is only necessary for an operator to push on the opposite end 43 to extend end 42 of the electrode and the spring fingers of the chuck member 32 are not strong enough to resist such urging by an operator, however, the spring fingers firmly hold the electrode in place during operation of the device.

The air ejection member 22, outward of the slots 38 is provided with a plurality of axially extending air openings 45, each being separate from the next adjacent opening and as a result circumferentially spaced from each other. Each of these openings communicates at one end with the air chamber 21 and then extends axially parallel with an electrode held in the chuck to the left, as seen in FIGURE 1, and they each terminate at the front face 47 of the air ejection member 22. A shield 49 is threadably secured at 51 to threads on the exterior of he air ejection member 22 and this shield 49 extends xially a short distance beyond the front face of the huck member and the air ejection member and extends annularly around the same to provide physical protection during handling and operation of the gun. The air exit openings 45 are designed so as to appropriately direct air to the end 42 of an electrode 40 during operation of the same so as to blow melted metal from the area which is being cut, gouged, or beveled. It has been found that the diameter and the length of the openings should bear a direct relationship to each other. It has been found that the ratio of the length of the opening over the diameter of the opening should be at least equal to six or greater and preferably at least eight. In other words, if the diameter of the opening were 1/32 of an inch, the length of the opening should be at least 9/32 of an inch.

Figure 2:
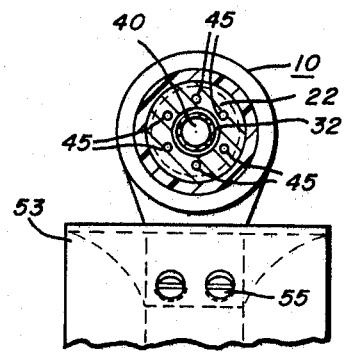
FIGURE 2 is a view taken generally along the line 2—2 of FIGURE 1.

A heat shield 53 is provided which has a comparatively large width as seen in FIGURE 2 and is held in position by screws 55. This heat shield 53 is in the proper position on the housing so as to shield the fingers and hand of an operator of the device from heat generated at the tip 42 of an electrode 40 during use of the gun. An electric cable 57 enters the housing 10 in the same area as the pipe threaded coupling 25 and is suitably attached to the metal body member 19. The purpose of this cable is to transmit an electrical potential to an electrode 40 which is held in the chuck member 32. This electrical potential is transmitted through the metal body member, plug 20 and the chuck 32 which is threadably secured thereto at 34 and thence through the electrode 40. The material of construction of the electrode is preferably carbon.

In order to utilize the present device it is necessary that an electrode 40 be inserted into the gun by placing the end 42 into the right end of the chuck as seen in FIGURE 1 and pushing the same through to an appropriate operating position. Electrical potential is applied to the electrode by way of cable 57 and air under pressure is admitted to chamber 21 by opening of the air valve 27 by way of the plunger 30. An operator of the device grips the housing in the same manner as he would in gripping a revolver or pistol and an arc is struck between the metal work and the end 42 of the electrode. Because of the potential difference between the work which is grounded and the end 42 of the electrode, an arc is maintained by holding the end 42 an appropriate distance from the work and as metal is melted, air traveling from the openings 45 blows the melted metal away leaving a void or opening and obviously many configurations may be cut in a metal surface depending upon the direction and method of movement of the gun. The construction of the air exit openings 45 as discussed hereinabove accomplishes an extremely effective removal of metal which is melted, resulting in the fact that for a given electrode size, it is possible to cut a cleaner, deeper and wider groove than in prior art devices because the air emanating from all sides of the electrode and dispersed from the constructed openings, tends to effectively remove the metal while not subjecting personnel working in the area to the dangerous splashing of metal as in prior art devices. The present metal cutting gun or apparatus operates in all work positions and operates in any direction by the simple expedient of an operator merely directing the device in a different direction. The action of the air in traveling from the openings exerts a cooling effect upon the electrode and the expelling of the air from chamber 21 also creates a cooling or refrigerating effect upon the gun. The convenient construction of the chuck and its connection to the metal body member 19 also assures less arcing and burning of the parts of the chuck which grip the electrode. It will also be apparent from a review of the above structure, operation, and result, that all of the hereinbefore stated objects are carried out and accomplished.

Figure 4:
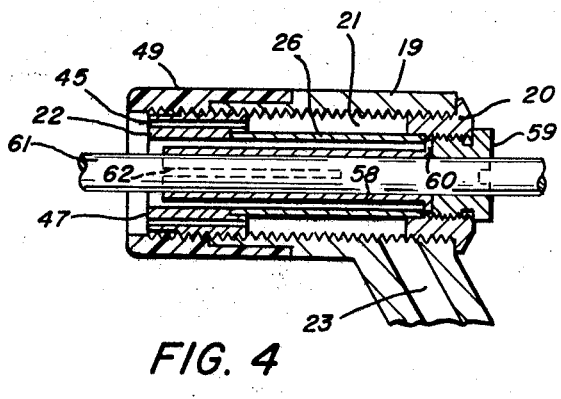
FIGURE 4 is an enlarged fragmentary view of a modification of the electrode chuck shown in FIGURE 1.

FIGURE 4 illustrates a modification of the means for holding the electrode chuck. As in the device of FIGURE 1 there is shown the body member 19 along with plug 20, air ejection member 22 and tubing 26. The electrode chuck 58 is a nonthreaded member held in place by means of a retainer 59 threadably secured to plug 22 and bearing against a shoulder 60 on the chuck 58. An electrode 61 is held by spring fingers on the chuck which in turn are formed by slots 62.

Figure 3:
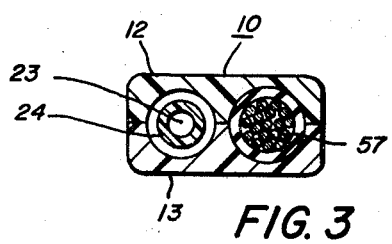
FIGURE 3 is a view taken generally along the line 3—3 of FIGURE 1.
Figure 5:
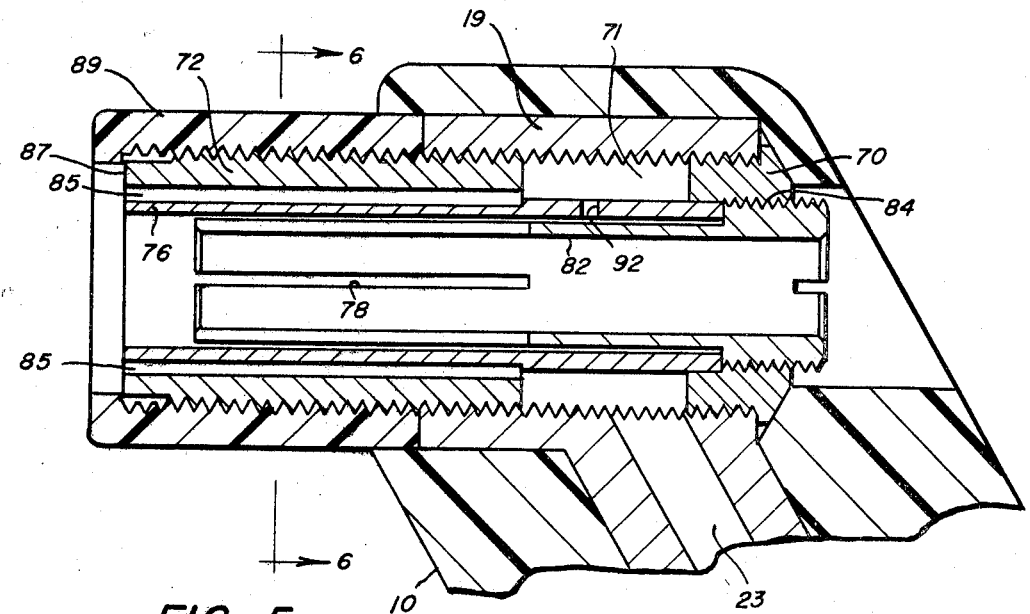
FIGURE 5 is an enlarged fragmentary view of a modification of the head of the metal cutting gun shown in FIGURE 1.
Figure 6:
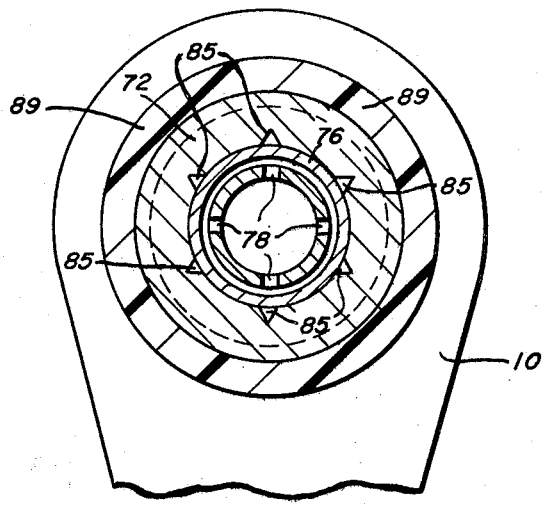
FIGURE 6 is a view taken generally along the line 6—6 of FIGURE 5.

FIGURES 5 and 6 show a modification of the metal cutting gun which is shown in FIGURES 1, 2 and 3. In this embodiment the structure includes the previous housing 10 and the metal body member 19 which is located therein defines the outer limits of an air chamber 71 and the air chamber 71 is closed at one end by a threaded plug 70 and at the other end by a threaded air ejection member 72. A piece of tubing 76 is press fitted at one end into the bore through the air ejection member 72 and at the other end mates with an internal bore of the threaded plug 70. This piece of tubing defines the inner limits of air chamber 71.

A chuck assembly is provided which includes a tubular chuck member 82 which extends axially through the air chamber 71. One end of the chuck member 82 is threadably secured to plug 70 by threads 84 and the other end of the chuck member extends through the tubing 76 in cantilever fashion. The other end portion of the tubular chuck member 82 is provided with a plurality of circumferentially spaced and axially extending slots 78 which serve to define spring fingers therebetween for the purpose of holding an electrode as described in conjunction with FIGURE 1. The air ejection member 72 is provided with a plurality of axially extending air openings 85. These openings are circumferentially spaced from each other and serve to completely surround the chuck member 82. These openings exit the air ejection member 72 at the front face 87 thereof and it will be noted that a shield 89 is threadably secured to the air ejection member and extends axially a short distance beyond the front face of the air ejection member.

Figure 7:
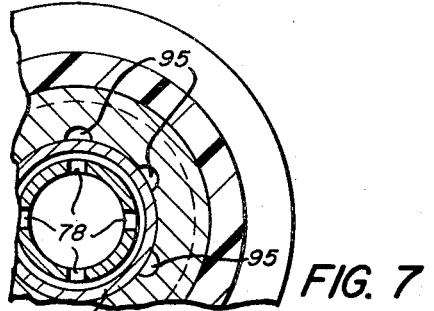
FIGURES 7 and 8 are views showing different shapes of air openings.
Figure 8:
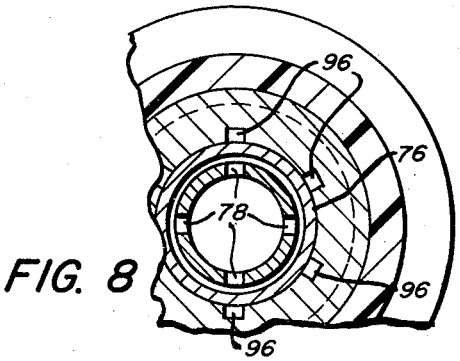

An opening 92 is provided in the wall of the tubing 76 to provide a passage from the air chamber 71 into the interior of the tubing 76 where the chuck member 82 is located. This small opening permits the passage of a relatively small amount of air around the chuck member 82, which is adapted to hold an electrode, and serves to exert a cooling effect on the chuck member resulting in longer life. Those skilled in the art are familiar with the fact that the chuck members tend to heat up during use because of the passage of electrical current through the same during operation of the device. The device illustrated in FIGURES 5 and 6 is utilized in the same manner as the device described in FIGURES 1, 2 and 3. It will be noted that the outside surface of the tubing 76 serves to define one side of the generally triangularly shaped air openings 85. FIGURES 7 and 8 demonstrate different shaped air openings 95 and 96 which are generally semi-circular and rectangular in configuration.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for metal cutting comprising a head having an opening extending therethrough, a tube member mounted in said opening and defining an annular space with said opening in said head, first and second closure members closing the open ends of said annular space, an annular electrode chuck located substantially concentrically within said tube member and being open at both ends, said chuck comprising a one piece integral tubular member, means at a first end of said chuck removably securing same in position and wall means defining axially extending slots at a second end defining electrode gripping fingers, said slots extending from an intermediate portion of said tubular member to the extreme end of said second end of said chuck, and wall means defining a plurality of openings extending through said first closure member and located around the gripping fingers of said chuck whereby air under pressure may be supplied to said annular space and emitted through said plurality of openings around an electrode held by said gripping fingers of said chuck.

2. Apparatus for metal cutting comprising a head having an opening extending therethrough, an annular member mounted in said opening and defining an annular space with said opening in said head, closure means closing the ends of said annular space, an electrode chuck located within said annular member and being open at both ends, said chuck comprising a one piece integral tubular member, means removably securing said chuck in position and wall means defining axially extending slots in said chuck defining electrode gripping fingers, said slots extending from an intermediate portion of said tubular member to the extreme end thereof, and wall means defining a plurality of openings extending through said closure means whereby air under pressure may be supplied to said annular space and emitted through said plurality of openings around an electrode held by said gripping fingers of such chuck.

3. Apparatus as claimed in claim 2 wherein a small opening is provided through said annular member to permit air to pass therethrough from said annular space to said electrode chuck to exert a cooling effect thereon.

4. Apparatus as claimed in claim 2 wherein a portion of the wall means which define said plurality of openings through said closure means is formed by said annular member.

5. Apparatus as claimed in claim 4 wherein each of said plurality of openings are generally triangular in cross section.

6. Apparatus as claimed in claim 2 wherein each of said plurality of openings are circular in cross section.

7. Apparatus as claimed in claim 4 wherein each of said plurality of openings are generally semi-circular in cross section.

8. A metal cutting gun including in combination a housing, wall means defining a chamber in said housing, an electrode chuck assembly including a chuck, said chuck comprising a one piece integral tubular member, means for introducing air under pressure into said chamber, one end portion of said electrode chuck having a plurality of axially extending slots defining at least one spring finger for holding an electrode adapted to extend axially therethrough with an end portion spaced from said gun and adapted to strike an arc between same and metal to be cut, said slots extending from an intermediate portion of said tubular member to the extreme end thereof, the other end portion of said electrode chuck being open to permit extension of an opposite end portion of the electrode therefrom, wall means defining a plurality of air exit openings of a given diameter and length extending at one end from said chamber substantially axially parallel with said electrode chuck, said air exit openings being spaced around said electrode chuck and adapted to direct air on all sides of the electrode to the place where the arc is to be struck, said air exit openings having a ratio of length over diameter which is equal to at least six.

9. A metal cutting gun as claimed in claim 8 wherein said electrode chuck assembly is generally cylindrically shaped and extends through said chamber to define an annular air chamber therearound.

10. A metal cutting gun as claimed in claim 9 wherein said air exit openings are spaced equidistantly from each other and on the order of sixty degrees apart.

References Cited

UNITED STATES PATENTS

| 1,309,696 | 7/1919 | Roberts et al. | 219—70 X |
| 2,422,265 | 6/1947 | Squires | 219—70 X |
| 3,113,201 | 12/1963 | Stepath | 219—70 |
| 3,187,154 | 6/1965 | Stepath | 219—70 |

JOSEPH V. TRUHE, Primary Examiner

R. F. STAUBLY, Assistant Examiner

U.S. Cl. X.R.

219—140